(12) United States Patent
Xie et al.

(10) Patent No.: US 9,366,939 B2
(45) Date of Patent: Jun. 14, 2016

(54) METHOD FOR GENERATING ULTRASHORT FEMTOSECOND PULSES IN OPTICAL PARAMETRIC OSCILLATOR PUMPED BY LONG PULSES

(71) Applicant: Shanghai Jiao Tong University, Shanghai (CN)

(72) Inventors: Guoqiang Xie, Shanghai (CN); Liejia Qian, Shanghai (CN); Fuyong Wang, Shanghai (CN); Zhipeng Qin, Shanghai (CN); Peng Yuan, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 14/846,695

(22) Filed: Sep. 4, 2015

(65) Prior Publication Data

US 2016/0131960 A1    May 12, 2016

(30) Foreign Application Priority Data

Nov. 6, 2014 (CN) .......................... 2014 1 0619856

(51) Int. Cl.
*G02F 1/35* (2006.01)
*G02F 1/355* (2006.01)
*G02F 1/39* (2006.01)

(52) U.S. Cl.
CPC ............ *G02F 1/3532* (2013.01); *G02F 1/3551* (2013.01); *G02F 1/39* (2013.01); *G02F 2001/354* (2013.01); *G02F 2001/392* (2013.01)

(58) Field of Classification Search
CPC .............. G02F 1/35; G02F 1/355; G02F 1/39
See application file for complete search history.

(56) References Cited

U.S. PATENT DOCUMENTS

| | | | | |
|---|---|---|---|---|
| 5,296,960 A * | 3/1994 | Ellingson | .................. | G02F 1/37 359/328 |
| 5,377,043 A * | 12/1994 | Pelouch | .................... | G02F 1/39 359/326 |
| 5,847,861 A * | 12/1998 | Kafka | ....................... | G02F 1/39 359/330 |
| 7,339,718 B1 * | 3/2008 | Vodopyanov | ............. | G02F 1/39 359/326 |
| 8,094,368 B2 * | 1/2012 | Ebrahim-Zadeh | .... | G02F 1/3532 359/328 |
| 2002/0003440 A1 * | 1/2002 | Qian | ..................... | H01S 3/1112 327/21 |

* cited by examiner

*Primary Examiner* — Daniel Petkovsek
(74) *Attorney, Agent, or Firm* — Mei & Mark LLP; Manni Li

(57) ABSTRACT

A method for generating ultrashort femtosecond pulses in the optical parametric oscillator pumped by long pulses, comprising governing dispersion and nonlinearity in the optical parametric oscillator, forming linearly-chirped long pulses with broad bandwidth in the optical parametric oscillator, compressing the linearly-chirped long pulses to femtosecond pulses by a second-order dispersion outside the optical parametric oscillator cavity. The ultrashort femtosecond pulse is generated in the OPO with long pulse pumping.

7 Claims, 5 Drawing Sheets

METHOD FOR GENERATING ULTRASHORT FEMTOSECOND PULSES IN OPTICAL PARAMETRIC OSCILLATOR PUMPED BY LONG PULSES

CROSS-REFERENCE AND RELATED APPLICATIONS

The subject application claims priority on Chinese patent application 201410619856.7 filed on Nov. 6, 2014 in China. The contents and subject matter of the Chinese priority application is incorporated herein by reference.

TECHNICAL FIELD

The present invention relates to ultrafast laser, particularly, a method for generating ultrashort femtosecond pulses in optical parametric oscillator (OPO) pumped by long pulses.

BACKGROUND OF THE INVENTION

The femtosecond laser has the advantages of short pulse duration and high peak power, and has been widely applied in many fields such as physics, chemistry, and biology. By femtosecond pulse synchronously-pumped optical parametric oscillator, the femtosecond laser from the near infrared to the mid-infrared wavelength could be generated. The synchronization requirement of the femtosecond pulse synchronously-pumped OPO is very critical, which limits the application of the femtosecond OPO.

Optical pulse compression is a technical means for compressing long pulses to ultrashort pulses. Typical pulse compression techniques include: first, the use of a multi-stage cascade nonlinear pulse compression (Qian, Liejia et al., Compression rate based on high-powered multi-stage cascade nonlinear process pulses, Patent No. CN1972042A), while the method is only suitable for high energy pulse compression (energy level at mJ pulse and above); and second, the third order nonlinear pulse compression material based on a large-scale material (C. Rolland et al., Compression of high-power optical pulses, J. Opt. Soc. Am. B., 1988, 5: 641-647), while the method of the beam deformation will occur, and it will be subject to self-focusing constraints.

SUMMARY OF THE INVENTION

The purpose of the present invention is to provide a new method for generating ultrashort femtosecond pulses by long-pulse pumped OPO. The method of the present invention is to generate energetic dual-color femtosecond pulses by long pulse pumping.

The method for generating femtosecond pulses of the present invention comprises: governing an intra-cavity net dispersion and a third-order nonlinearity in a long-pulse pumped OPO, wherein an output linearly-chirped signal and idler long pulses with broad bandwidth are generated from the long-pulse pumped OPO; compressing the output linearly-chirped signal and the idler long pulses to femtosecond pulses by dispersion compensation outside OPO cavity. The long-pulse pumped OPO eliminates the synchronization requirement and benefits to generate energetic femtosecond pulses by the high-energy long pulse pumping.

The mechanism of generating femtosecond pulses by long pulses pumped OPO is as follows: an optical pulse is amplified by a nonlinear crystal; a net second-order dispersion in an OPO cavity facilitates the formation of a linear chirp of optical pulses; the spectrum of the optical pulse is broadened by a third-order nonlinearity. When the sign of the dispersion is the same as that of the third-order nonlinear phase shift, an intra-cavity optical pulse may evolve into a linearly-chirped pulse with broad bandwidth. Since the long pump pulse is generally of narrow bandwidth, the output idler pulse is naturally linearly chirped. By compensating for the second-order dispersion outside OPO cavity, the linearly-chirped signal and idler pulses may be compressed to femtosecond pulses. The primary merit of the method is that femtosecond pulses at different wavelengths may be generated in the OPO with long pulse pumping.

The present invention provides OPO system parameters to make intra-cavity dispersion and nonlinearity with the same sign, linearly-chirped pulses with broad bandwidth may be formed in the long pulse pumped OPO. Then, by compensating for dispersion outside the cavity, the output linearly-chirped signal and idler pulses may be compressed to femtosecond pulses. The detailed steps and requirements for the system parameters are as follows:

① The signal wavelength is firstly chosen at a desired wavelength.

② The relative large third-order nonlinearity with regard to self phase modulation should exist in the OPO cavity. The third-order nonlinearity is used to broaden signal spectrum and relatively broad signal spectrum is a prerequisite of compressing pulse effectively. The third-order nonlinearity effect in the OPO cavity may be provided through the following three ways.

(a) Third-order nonlinear material with large nonlinear refractive index (for example ZnSe) may be inserted into the OPO cavity to provide the required third-order nonlinearity for broadening signal spectrum effectively.

(b) When the nonlinear refractive index of the OPO nonlinear crystal is large ($>10^{-19}$ $m^2/W$), the OPO nonlinear crystal itself may provide the required third-order nonlinearity.

(c) If the phase-mismatched second-order optical parametric process of signal takes place in the OPO, the cascade nonlinearity process may provide the required third-order nonlinearity.

③ Dispersive management is performed in the OPO cavity. Certain amount of the net second-order intra-cavity dispersion with the same sign of the third-order nonlinear phase shift is required for generating linearly-chirped pulse in OPO.

(a) When the sign of the third-order nonlinear phase shift caused by nonlinear material or OPO crystal is positive, the sign of the intra-cavity net dispersion should be positive. On the contrary, if the sign of the third-order nonlinear phase shift is negative, the sign of the intra-cavity net dispersion should also be negative.

(b) When third-order nonlinearity is provided by cascade nonlinearity of signal, the sign of the intra-cavity net dispersion should be as same as that of cascade nonlinearity phase shift.

④ Dispersion compensation device should be used to dechirp the linearly-chirped signal and idler pulses outside the OPO cavity. The required amount of dispersion for dechirping signal (idler) is determined by the amount of signal (idler) chirp. After dispersion compensation outside the cavity, the signal and idler pulses are compressed to femtosecond regime.

The present invention has the following advantages:

(1) Compared with the traditional femtosecond OPO, the present invention significantly reduces the synchronization requirement between the pump and the signal, and increases the OPO stability.

(2) By high-energy long pulse pumping at near infrared wavelength, the method of the present invention largely increases the mid-infrared femtosecond pulse energy.

(3) The OPO technique of the present invention may output synchronous dual-color femtosecond pulses with high pulse energy, which is very useful for pump-probe experiment, ultrafast spectroscopy, etc.

DETAILED DESCRIPTION AND PREFERRED EMBODIMENTS OF THE INVENTION

The present invention is described in details in the following embodiments.

Figure 1:
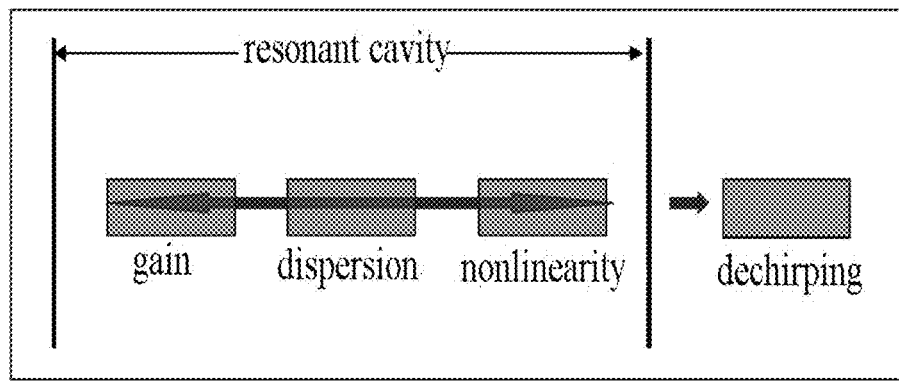
FIG. 1 is a diagram illustrating the OPO elements of the present invention.

In the first embodiment of the present invention, as shown in FIG. 1, there are OPO nonlinear crystal, dispersive element, and third-order nonlinear material in the OPO cavity. The signal pulse is amplified by the OPO nonlinear crystal; a linear chirp of signal pulse is formed by the dispersive element; and the third-order nonlinear material causes the spectrum broadening of the signal pulse. Dispersion compensation device is set outside the cavity to dechirp the signal and idler pulses.

The numerical simulation in the embodiment of the present invention is explained in greater details as follows.

KTA is selected as the OPO nonlinear crystal with a length of 1 mm. Pump pulse has an intensity of 2.46 GW/cm$^2$ at 1064 nm wavelength. The signal wavelength (oscillating wave) is selected at 3300 nm and idler wavelength is at 1570 nm. The nonlinear refractive index of KTA is $n_2=1.7\times10^{-19}$ m$^2$/W. KTA OPO nonlinear crystal also serves as the third-order nonlinear material. Since the sign of $n_2$ is positive, the nonlinear phase shift provided by $n_2$ is also positive. The dispersion of signal in nonlinear crystal is negative with a value of −480 fs$^2$/mm. According to the requirement of the present invention, the net dispersion in the OPO cavity must be positive. Thus a Ge plate with a length of 0.55 mm is inserted in the OPO cavity which provides a positive dispersion of 785 fs$^2$, and the net intra-cavity dispersion is +305 fs$^2$.

Figure 2:
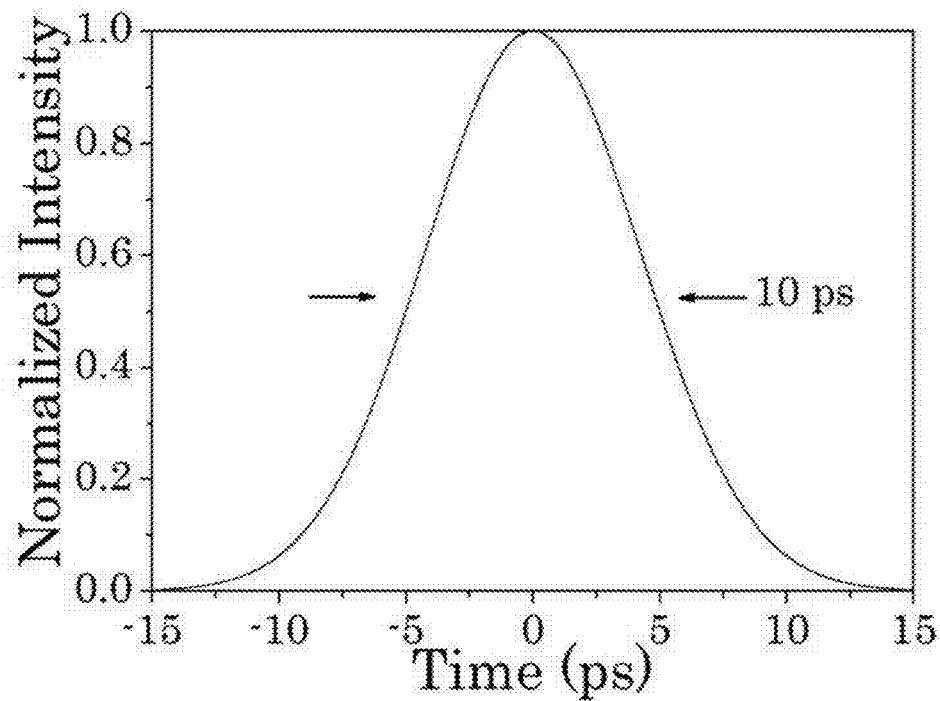
FIG. 2 is a diagram illustrating the temporal shape of the pump pulse in the first embodiment of the present invention. The pump pulse is a no-chirp Gaussian pulse with a pulse width of 10 ps.

As shown in FIG. 2, the pump pulse is a transform-limited Gaussian pulse with a pulse width of 10 ps.

Figure 3:
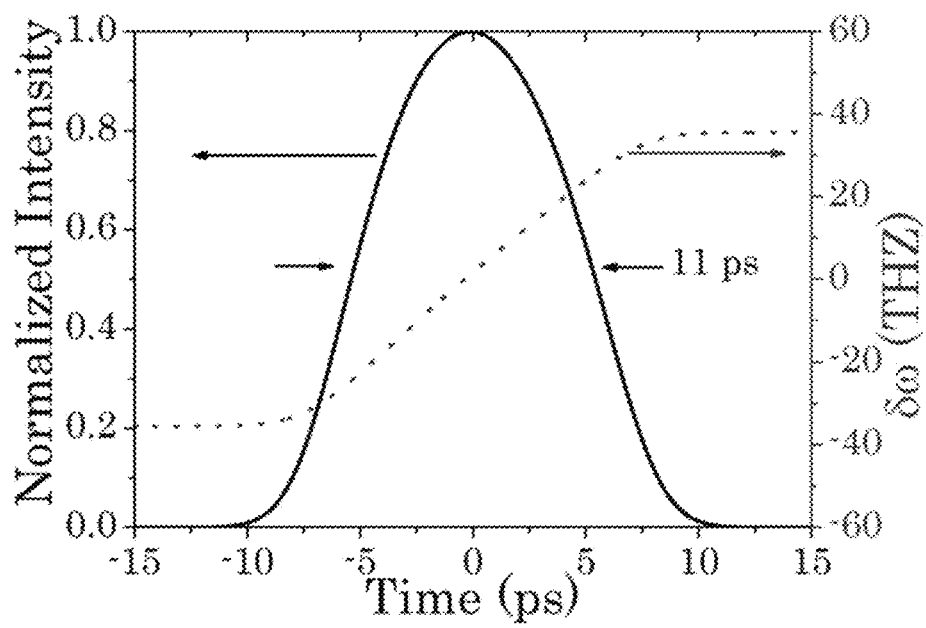
FIG. 3 is a diagram illustrating the temporal shape and chirp of the output signal pulse from the OPO in the first embodiment of the present invention; in the figure, the block solid line represents the temporal pulse shape of signal, and the gray dot line represents the signal chirp.

The OPO coupled wave equations are numerically simulated with split-step Fourier transform algorithm and the simulation results are as follows:

As shown in FIG. 3, the signal pulse is linearly chirped with pulse duration of 1ps after reaching to steady state in the OPO cavity.

Figure 4:
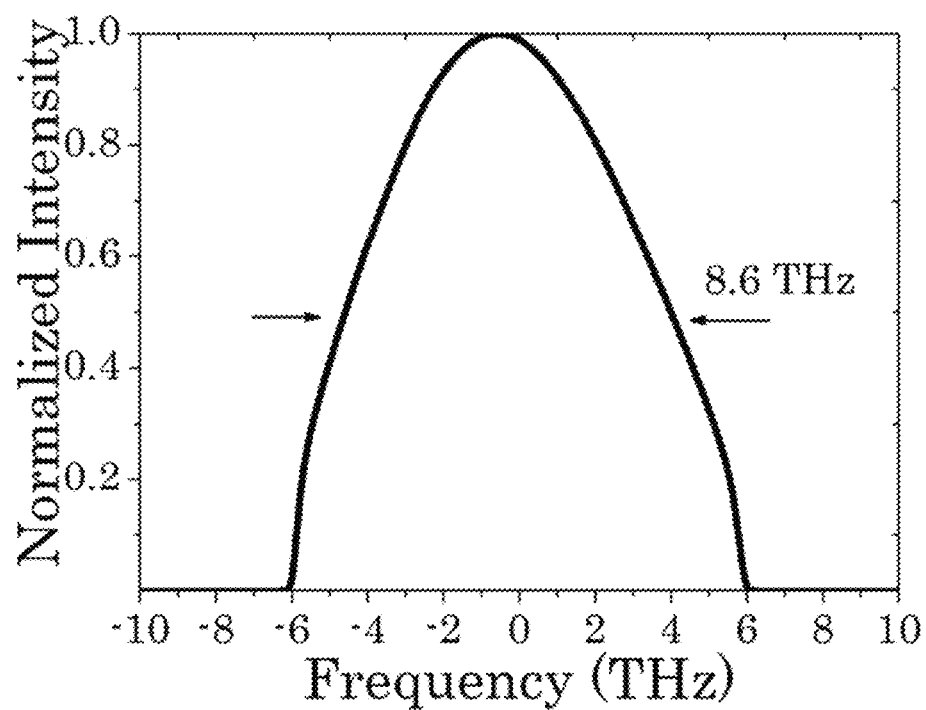
FIG. 4 is a diagram illustrating the signal pulse spectrum in the first embodiment of the present invention.

As shown in FIG. 4, the spectral bandwidth of the output signal pulse is 8.6 THz.

Figure 5:
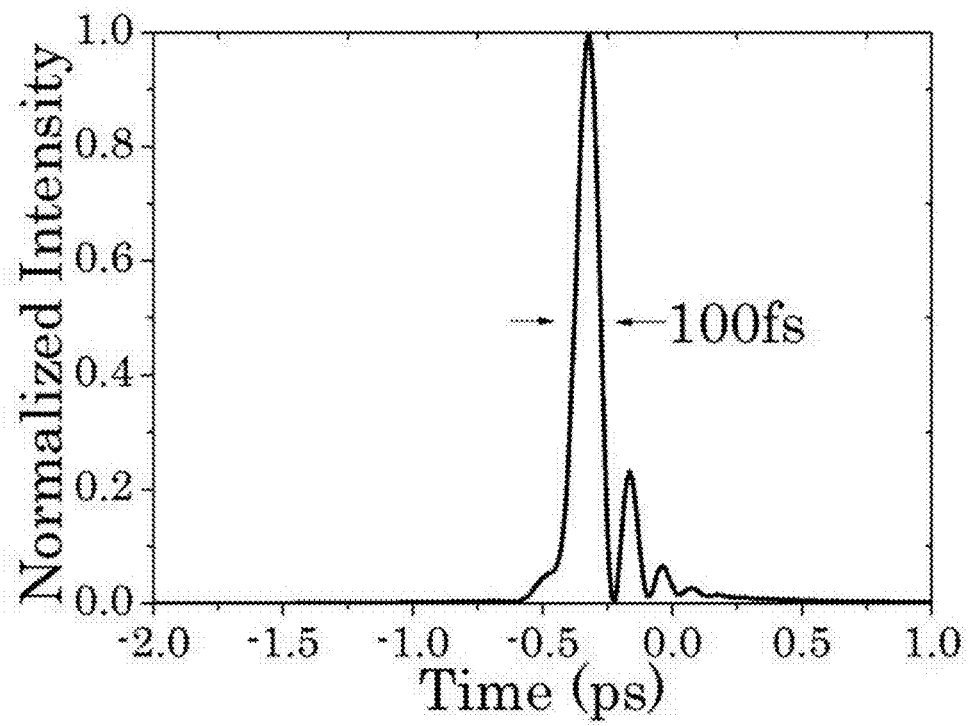
FIG. 5 is a diagram illustrating the temporal pulse shape of the signal pulse after compression outside the cavity in the first embodiment of the present invention.

As shown in FIG. 5, the signal pulse shape after compression outside the OPO cavity. The provided dispersion amount is −214300 fs$^2$ to compress signal pulse outside the cavity. A femtosecond pulse with a duration of 100 fs is obtained after compression.

Figure 6:
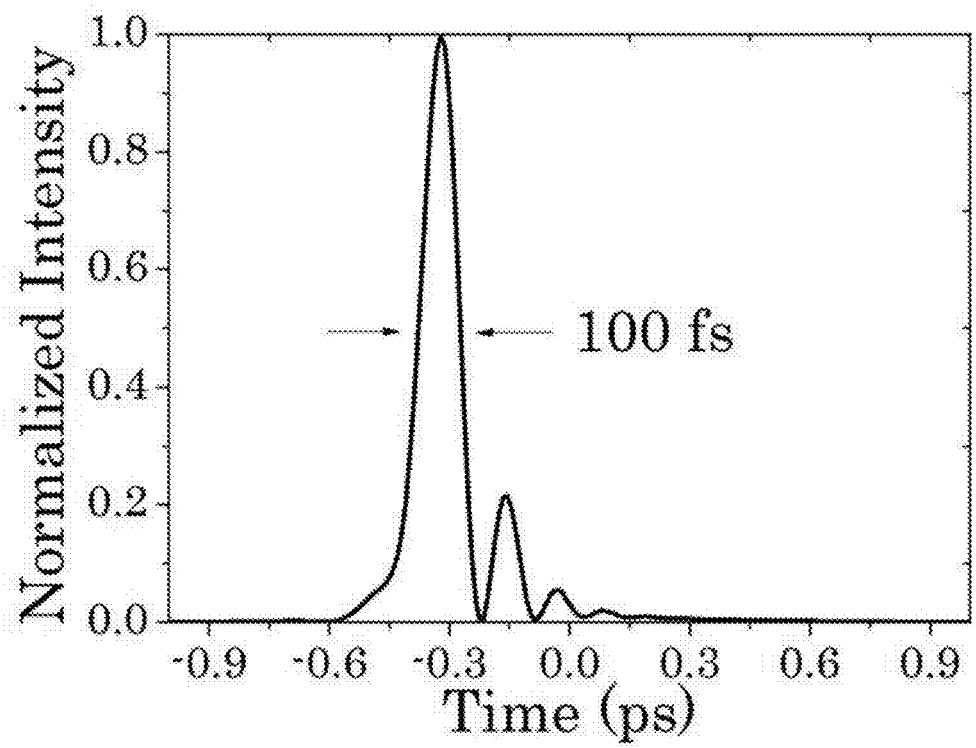
FIG. 6 is a diagram illustrating the temporal pulse shape of the idler pulse after compression outside the cavity in the first embodiment of the present invention.

As shown in FIG. 6, the idler pulse shape after compression outside the cavity. According to simulation results, idler pulse is also linearly-chirped. By compensating +214300 fs$^2$ dispersion outside the cavity, idler pulse is compressed to ~100 fs.

Figure 7:
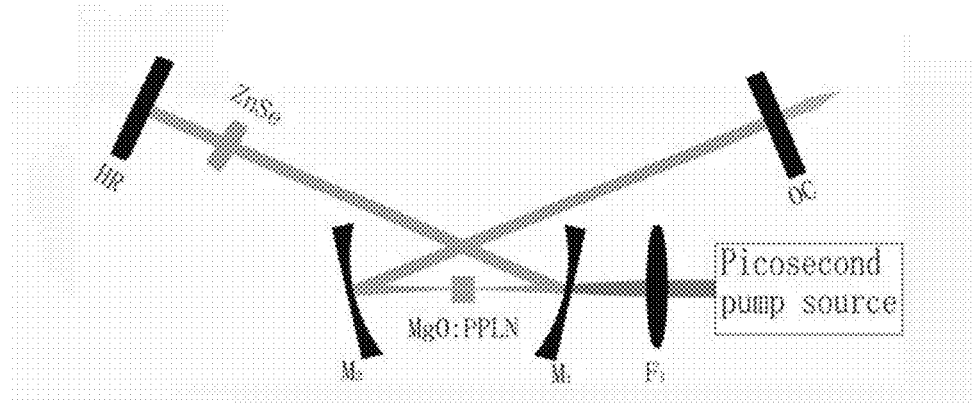
FIG. 7 is a diagram illustrating the experimental setup of the OPO in the second embodiment of the present invention.

In the second embodiment of the present invention, the experimental embodiment is listed to further describe the present invention in greater details. As shown in FIG. 7, the experimental setup of OPO is as follows. Periodically poled lithium niobate (PPLN) is chosen as nonlinear crystal with grating period $\Lambda=31.02$ μm. The pump pulse is a transform-limited Gaussian pulse with a duration of 2 ps. The wavelength of pump is at 1030 nm and the signal (oscillating wave) and idler wavelengths are at 2180 nm and 1950 nm, respectively. The length of the PPLN crystal is 2 mm with a nonlinear refractive index of $n_2=8.5\times10^{-20}$ m$^2$/W. The third-order nonlinear effect caused by the nonlinear refractive index is very small. Considering the existence of the second harmonic generation of the signal pulse and the sum frequency generation between the signal and the pump in PPLN, the cascade nonlinearities in nonlinear crystal is dominant for providing the third-order nonlinear phase shift. The second harmonic generation of the signal in PPLN has a phase mismatching amount $\Delta k_Q<0$ ($\Delta k=61.8\pi$/mm, $\Delta k_Q=\Delta k-2\pi/\Lambda=-2.6\pi$/mm), which provides a positive nonlinear phase shift to signal. On the contrary, the sum frequency generation between the signal and the pump in PPLN has a positive phase mismatching amount $\Delta k_Q>0$ ($\Delta k=125.97\pi$/mm, $\Delta k_Q=\Delta k-2\pi/\Lambda=61.5\pi$/mm), which provides a negative nonlinear phase shift to signal. By calculation, the total nonlinear phase shift caused by the two kinds of cascade nonlinearities is positive. The dispersion amount of the signal in the PPLN is −85 fs$^2$/mm. A piece of ZnSe plate with a length of 2 mm is inserted into OPO cavity to serve as dispersion management element, which provides dispersion with a value of +500 fs$^2$ to signal. In this way, ZnSe offsets the negative dispersion of PPLN and the intra-cavity net dispersion is +330 fs$^2$. Therefore, both the intra-cavity net dispersion and third-order nonlinear phase shift are positive.

Figure 8:
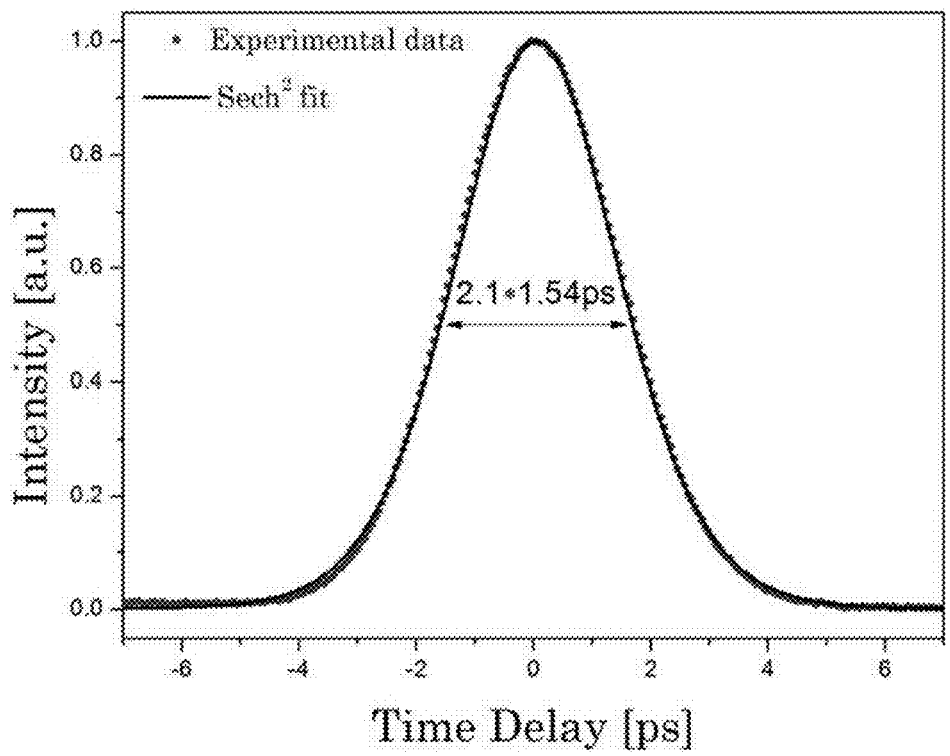
FIG. 8 is a diagram illustrating the autocorrelation trace and Sech$^2$ fitting of the output signal pulse from the OPO in the second embodiment of the present invention.

As shown in FIG. 8, the output signal pulse has a width of 2.1 ps in the experiment.

Figure 9:
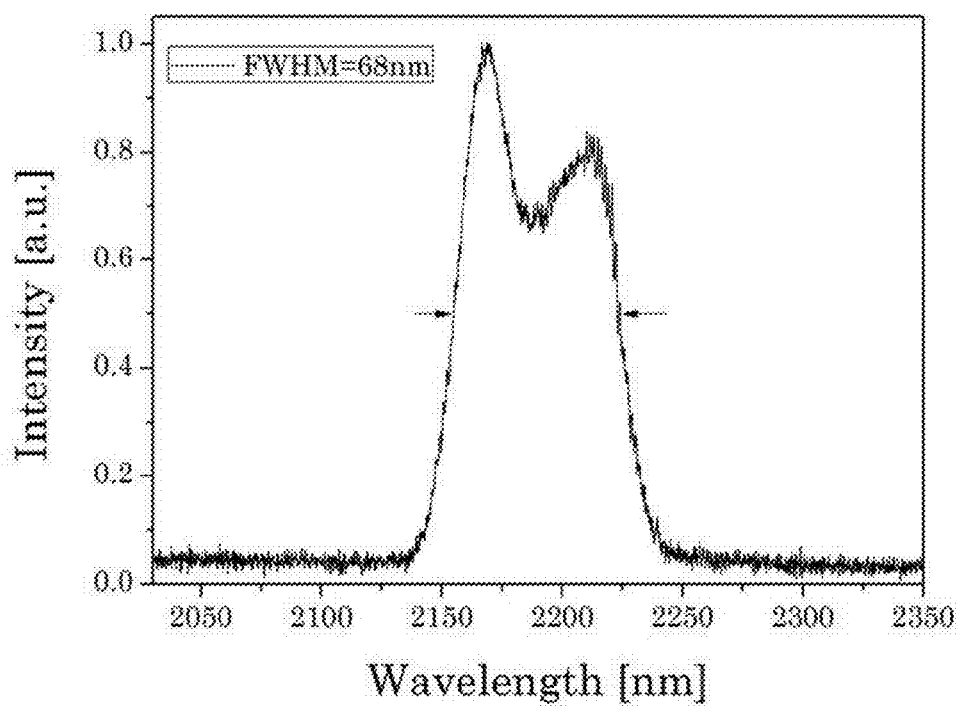
FIG. 9 is a diagram illustrating the signal pulse spectrum in the second embodiment of the present invention.

As shown in FIG. 9, the signal pulse spectrum has a bandwidth of 68 nm, implying a giant chirp of signal pulse.

Figure 10:
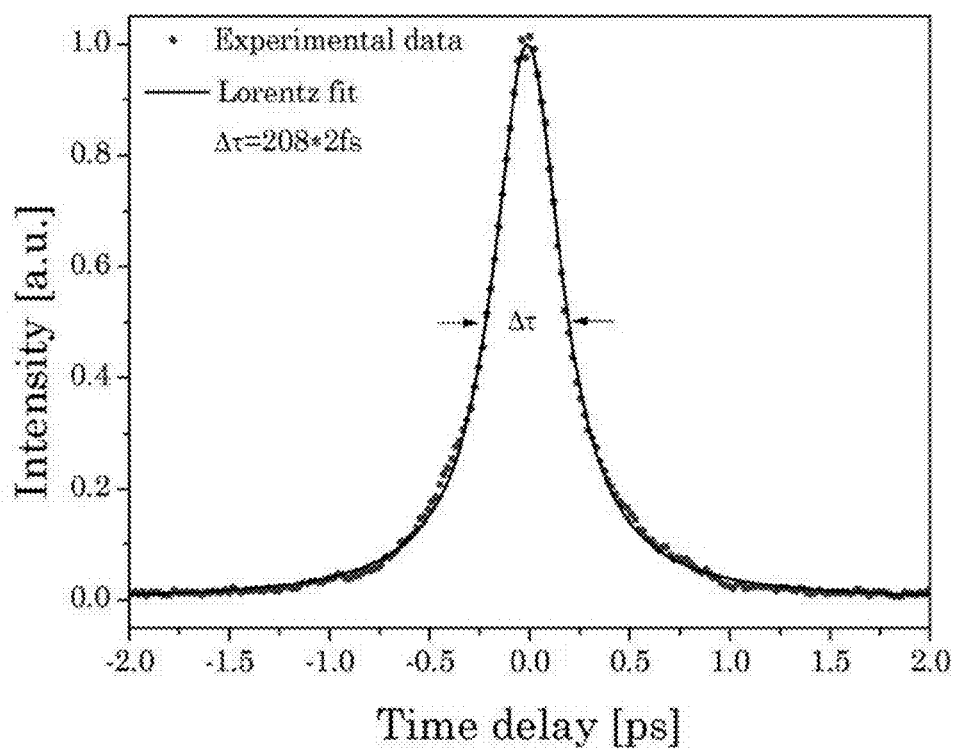
FIG. 10 is a diagram illustrating the autocorrelation trace and the Lorentz curve fitting of the signal pulse after compression outside the cavity in the second embodiment of the present invention.

As shown in FIG. 10, the autocorrelation trace of signal pulse after compression is outside the OPO cavity. A pair of Ge prisms are adopted outside the cavity to compress signal pulse. The tip to tip distance between the two prisms is 14 cm, which provides a dispersion amount of $-77920$ fs$^2$. The signal pulse is compressed from 2.1 ps to 208 fs.

In the present invention, femtosecond pulse at different wavelengths is generated from the long pulse pumped OPO by governing the intra-cavity dispersion and nonlinearity. The method of the present invention has great potential applications for generating high-energy mid-infrared pulse, CPA chirped seeding pulse, and few-cycle pulse, etc.

We claim:

1. A method for generating ultrashort femtosecond pulses, comprising:
    selecting a desired signal wavelength,
    setting self phase modulation elements in a cavity of an optical parametric oscillator to cause a third-order nonlinearity effect in the cavity of the optical parametric oscillator,
    setting a net second-order dispersion in the cavity of the optical parametric oscillator and inserting a dispersive management element into the cavity of the optical parametric oscillator to guarantee that a sign of the intra-cavity net second-order dispersion is the same as a sign of the third-order nonlinearity, wherein the intra-cavity net dispersion is jointly provided by a nonlinear crystal and the dispersive management element,
    setting a dispersion compensation device outside the cavity of the optical parametric oscillator to provide a dispersion with a sign being opposite to the sign of the intra-cavity net dispersion, determining the amount of the dispersion by an amount of signal chirp, dechirping signal pulses, and compressing the signal pulses to a femtosecond regime after dechirping, and
    linearly chirping output idler pulses with a sign being opposite to the sign of the signal pulses, compensating for the second-order dispersion outside the cavity of the optical parametric oscillator, and compressing the idler pulses to the femtosecond regime.

2. The method for generating ultrashort femtosecond pulses according to claim 1, wherein the third-order nonlinearity effect is caused by a nonlinear crystal of the optical parametric oscillator having a nonlinear refractive index of greater than an order of $10^{-19}$ m$^2$/W.

3. The method for generating ultrashort femtosecond pulses according to claim 2, wherein when the third-order nonlinearity provided by the nonlinear crystal of the optical parametric oscillator is positive, and the sign of the intra-cavity net dispersion is positive; and when the third-order nonlinearity provided by the nonlinear crystal of the optical parametric oscillator is negative, the sign of the intra-cavity net dispersion is negative.

4. The method for generating ultrashort femtosecond pulses according to claim 1, wherein the third-order nonlinearity effect is caused by a cascade nonlinearity in a nonlinear crystal where a phase-mismatched second-order optical parametric process of signal takes place.

5. The method for generating ultrashort femtosecond pulses according to claim 4, wherein the sign of the intra-cavity net dispersion is determined by a sign of the cascade nonlinear phase shift, and
    when the sign of the cascade nonlinear phase shift is positive, the sign of the intra-cavity net dispersion is positive, and when the sign of the cascade nonlinear phase shift is negative, the sign of the intra-cavity net dispersion is negative.

6. The method for generating ultrashort femtosecond pulses according to claim 1, wherein the third-order nonlinearity effect is caused by inserting a third-order nonlinearity material into the cavity of the optical parametric oscillator to provide the third-order nonlinearity for broadening signal spectrum.

7. The method for generating ultrashort femtosecond pulses according to claim 6, wherein when the third-order nonlinearity provided by the third-order nonlinearity material is positive, the sign of the intra-cavity net dispersion is positive; and when the third-order nonlinearity provided by the third-order nonlinearity material is negative, the sign of intra-cavity net dispersion is negative.

* * * * *